United States Patent
Karaoguz et al.

(10) Patent No.: US 8,810,565 B2
(45) Date of Patent: Aug. 19, 2014

(54) METHOD AND SYSTEM FOR UTILIZING DEPTH INFORMATION AS AN ENHANCEMENT LAYER

(75) Inventors: Jeyhan Karaoguz, Irvine, CA (US); Nambi Seshadri, Irvine, CA (US); Xuemin Chen, Rancho Santa Fe, CA (US); Chris Boross, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 103 days.

(21) Appl. No.: 13/077,868

(22) Filed: Mar. 31, 2011

(65) Prior Publication Data

US 2012/0050264 A1   Mar. 1, 2012

Related U.S. Application Data

(60) Provisional application No. 61/439,113, filed on Feb. 3, 2011, provisional application No. 61/377,867, filed on Aug. 27, 2010.

(51) Int. Cl.
*G06T 15/00* (2011.01)
*G06T 15/10* (2011.01)

(52) U.S. Cl.
USPC .......................................... 345/419; 345/427

(58) Field of Classification Search
CPC ......... G06T 19/00; G06T 17/20; G06T 17/00; G06T 15/10; G06T 15/00; G06T 15/20; G06F 3/04815
USPC .......................................... 345/419; 382/232
See application file for complete search history.

(56) References Cited

U.S. PATENT DOCUMENTS

2006/0088222 A1* 4/2006 Han et al. ...................... 382/232
2012/0092452 A1* 4/2012 Tourapis et al. ................ 348/43

OTHER PUBLICATIONS

Andre' Redert, ATTEST:Advanced Three-dimensional Television System Technologies, Nov. 7, 2002,IEEE Conference Publications 3D Data Processing Visualization and Transmission, Jun. 19-21, 2002. Proceedings. First International Symposium, pp. 313-319.*
Ioana M. Martin; ARTE—An Adaptive Rendering and Transmission Environment for 3D Graphics; Multimedia '00 Proceedings of the eighth ACM international conference on Multimedia; ACM New York, NY USA ©2000; pp. 413-415.*
Christoph Fehn, Depth-Image-Based Rendering (DIBR); Compression and Transmission for a New Approach on 3D-TV; May 21, 2004—Stereoscopic Displays and Virtual Reality Systems Xl, 93; SPIE-IS&T/vol. 5291; pp. 93-104.*

(Continued)

*Primary Examiner* — Kee M Tung
*Assistant Examiner* — Nicole Gillespie
(74) *Attorney, Agent, or Firm* — Brinks Gilson & Lione

(57) ABSTRACT

A monoscopic 3D video generation device, which comprises one or more depth sensors, may be operable to store captured 2D video image data as a base layer and store captured corresponding depth information separately as an enhancement layer. The 2D video image data may be captured via one or more image sensors and the corresponding depth information may be captured via the one or more depth sensors in the monoscopic 3D video generation device. The monoscopic 3D video generation device may determine whether to transmit the enhancement layer to a video rendering device. The monoscopic 3D video generation device may encode the base layer. The monoscopic 3D video generation device may encode the enhancement layer based on the determination of transmitting the enhancement layer. The encoded base layer and/or the encoded enhancement layer may be transmitted to the video rendering device for 3D video rendering and/or 2D video rendering.

20 Claims, 8 Drawing Sheets

(56) References Cited

OTHER PUBLICATIONS

Real time Hand Gesture Recognition using a Range Camera Zhi Li, Ray Jarvis Monash University Wellington Road Clayton, Victoria Australia.
Comparison of Stereo Video Coding Support in MPEG-4, MAC, H,264/AVC, and H.264/SVC C.T.E.R. Hewage, H.A. Karim, S.Worrall, S.Dogan, A.M. Kondoz Centre for Communication Systems Research University of Surrey Guildford, Surrey, GU2 7XH, U.K.
Iddan G J et al: "3D Imaging in the Studio (and Elsewhere . . .)", Proceedings of SPIE, US, Vo. 4298, Jan. 24, 2001, pp. 48-55, XP008005351, ISSN: 0277-786X, DOI: 10.1117/12.424913.
Marc J.R. Op De Beeck: "Towards an optimized 3D broadcast chain", Proceedings of SPIE, vol. 4864, Jan. 1, 2002, pp. 42-50, XP55026172, ISSN: 0277-786X, DOI: 10.1117/12.454933.
Schwarz H et al: "Overview of the Scalable Extension of the H.264/MPEG-4 AVC Video Coding Standard", IEEE Transactions on Circuits and Systems for Video Technology, IEEE Service Center, Piscataway, NJ, US, vol. 17, No. 9, Sep. 1, 2007, pp. 1103-1120, XP008108972, ISSN: 1051-8215, DOI: 10.1109/TCSVT.2007.905532.
C.T.E.R. Hewage et al: "Stereoscopic TV over IP", IET 4$^{th}$ European Conference on Visual Medial Production (CVMP 2007), vol. 2007, Jan. 1, 2007, pp. 30-30, XP55026182, DOI: 10.1049/cp:20070062, ISBN: 978 0 86341 843 3.
European Search Report Dated Jun. 13, 2012.

\* cited by examiner

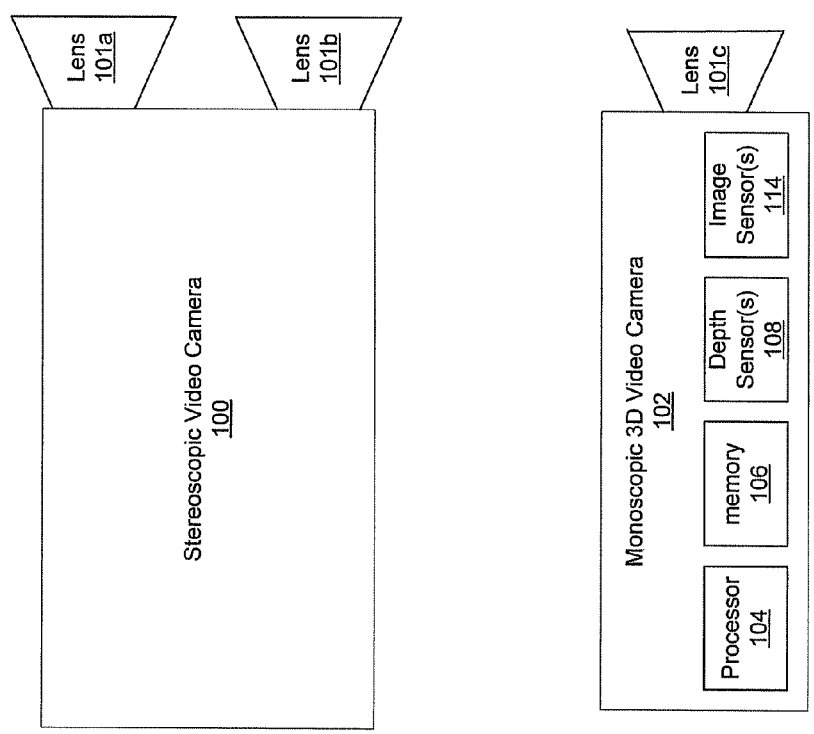

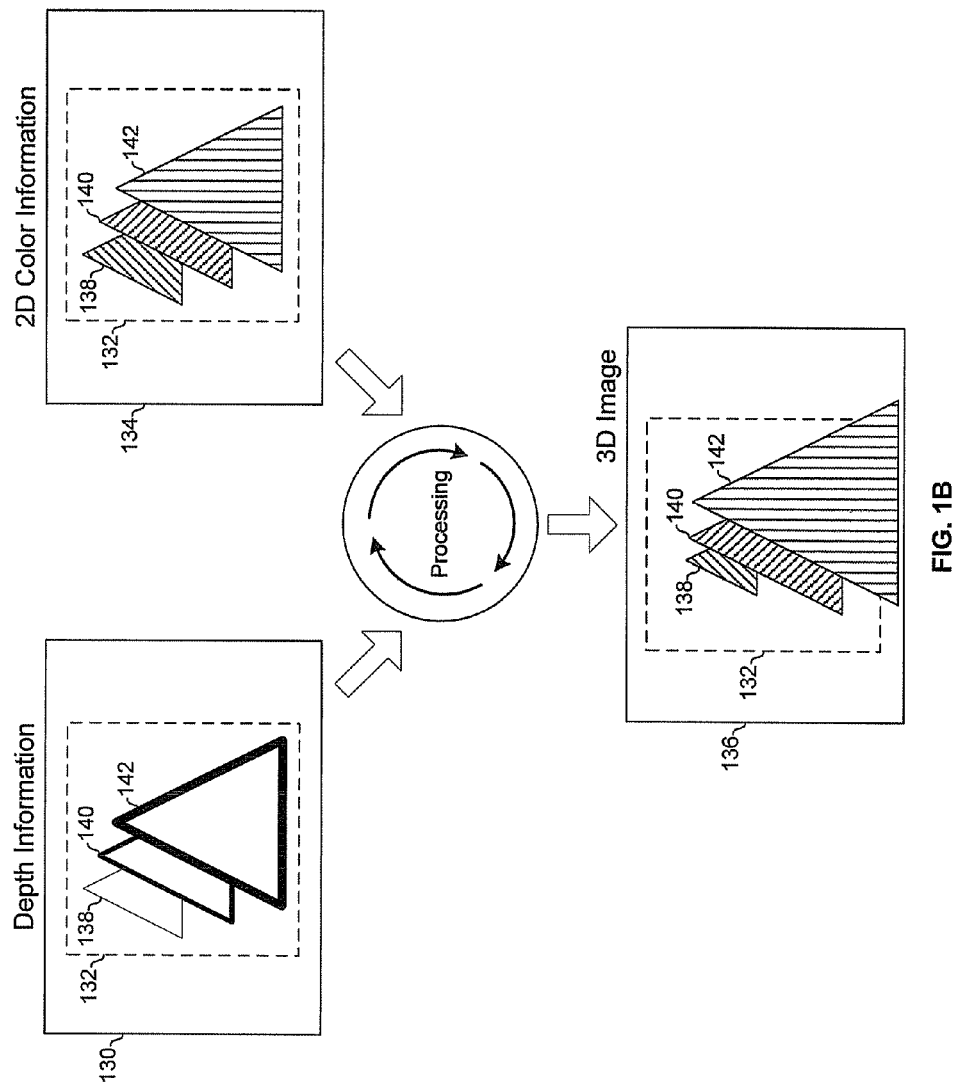

METHOD AND SYSTEM FOR UTILIZING DEPTH INFORMATION AS AN ENHANCEMENT LAYER

CROSS-REFERENCE TO RELATED APPLICATIONS/INCORPORATION BY REFERENCE

This patent application makes reference to, claims priority to, and claims benefit from:
U.S. Provisional Application Ser. No. 61/377,867, which was filed on Aug. 27, 2010; and
U.S. Provisional Application Ser. No. 61/439,113, which was filed on Feb. 3, 2011.
This patent application also makes reference to:
U.S. Patent Application Ser. No. 61/439,193 filed on Feb. 3, 2011;
U.S. patent application Ser. No. 13/077,900 filed on Mar. 31, 2011;
U.S. Patent Application Ser. No. 61/439,274 filed on Feb. 3, 2011;
U.S. patent application Ser. No. 13/077,912 filed on Mar. 31, 2011;
U.S. Patent Application Ser. No. 61/439,283 filed on Feb. 3, 2011;
U.S. patent application Ser. No. 13/077,922 filed on Mar. 31, 2011;
U.S. Patent Application Ser. No. 61/439,130 filed on Feb. 3, 2011;
U.S. patent application Ser. No. 13/077,886 filed on Mar. 31, 2011;
U.S. Patent Application Ser. No. 61/439,290 filed on Feb. 3, 2011;
U.S. patent application Ser. No. 13/077,926 filed on Mar. 31, 2011;
U.S. Patent Application Ser. No. 61/439,119 filed on Feb. 3, 2011;
U.S. patent application Ser. No. 13/077,893 filed on Mar. 31, 2011;
U.S. Patent Application Ser. No. 61/439,297 filed on Feb. 3, 2011;
U.S. patent application Ser. No. 13/077,923 filed on Mar. 31, 2011;
U.S. Patent Application Ser. No. 61/439,201 filed on Feb. 3, 2011;
U.S. Patent Application Ser. No. 61/439,209 filed on Feb. 3, 2011;
U.S. Patent Application Ser. No. 61/439,103 filed on Feb. 3, 2011;
U.S. patent application Ser. No. 13/077,880 filed on Mar. 31, 2011;
U.S. Patent Application Ser. No. 61/439,083 filed on Feb. 3, 2011;
U.S. patent application Ser. No. 13/077,899 filed on Mar. 31, 2011;
U.S. Patent Application Ser. No. 61/439,301 filed on Feb. 3, 2011;
U.S. patent application Ser. No. 13/077,930 filed on Mar. 31, 2011;
Each of the above stated applications is hereby incorporated herein by reference in its entirety.

FIELD OF THE INVENTION

Certain embodiments of the invention relate to video processing. More specifically, certain embodiments of the invention relate to a method and system for utilizing depth information as an enhancement layer.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV (DTV), a 3D video is often desirable because it is often more realistic to viewers than the 2D counterpart. A 3D video comprises a left view video and a right view video.

Various video encoding standards, for example, MPEG-1, MPEG-2, MPEG-4, MPEG-C part 3, H.263, H.264/MPEG-4 advanced video coding (AVC), multi-view video coding (MVC) and scalable video coding (SVC), have been established for encoding digital video sequences in a compressed manner. For example, the MVC standard, which is an extension of the H.264/MPEG-4 AVC standard, may provide efficient coding of a 3D video. The SVC standard, which is also an extension of the H.264/MPEG-4 AVC standard, may enable transmission and decoding of partial bitstreams to provide video services with lower temporal or spatial resolutions or reduced fidelity, while retaining a reconstruction quality that is similar to that achieved using the H.264/MPEG-4 AVC.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for utilizing depth information as an enhancement layer, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a block diagram that illustrates an exemplary monoscopic 3D video camera embodying aspects of the present invention, compared with a conventional stereoscopic video camera.

FIG. 1B is a block diagram that illustrates exemplary processing of depth information and 2D color information to generate a 3D image, in accordance with an embodiment of the invention.

DETAILED DESCRIPTION OF THE INVENTION

Figure 2:
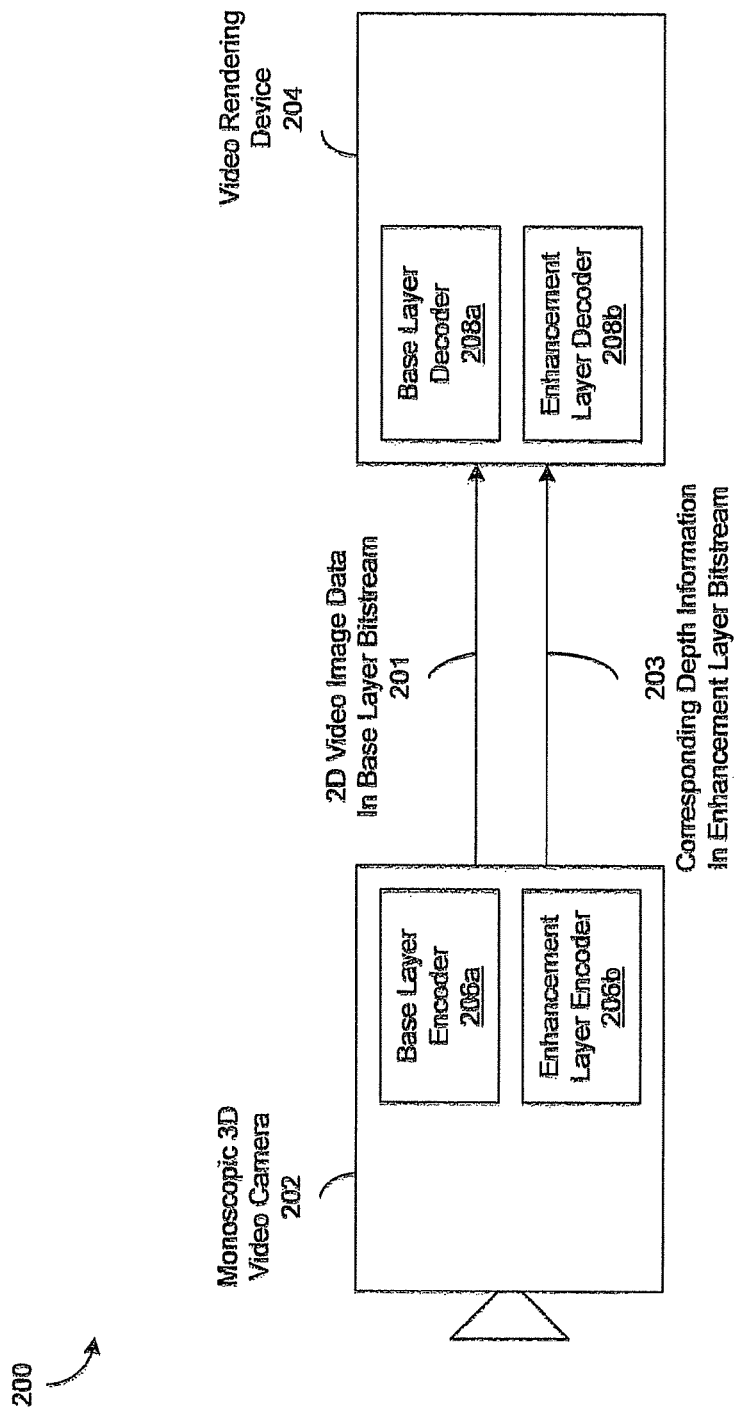
FIG. 2 is a block diagram illustrating an exemplary video communication system that is operable to utilize depth information as an enhancement layer, in accordance with an embodiment of the invention.

Certain embodiments of the invention can be found in a method and system for utilizing depth information as an enhancement layer. In various embodiments of the invention, a monoscopic three-dimensional (3D) video generation device, which comprises one or more depth sensors, may be operable to store captured two-dimensional (2D) video image data as a base layer and store captured corresponding depth information separately as an enhancement layer. The 2D video image data may be captured via one or more image sensors in the monoscopic 3D video generation device. The corresponding depth information may be captured via the one or more depth sensors in the monoscopic 3D video generation device.

In an exemplary embodiment of the invention, the monoscopic 3D video generation device may be operable to determine whether to transmit the enhancement layer to a video rendering device. The determination may be based on, for example, a request from the video rendering device and/or capabilities and/or capacities of the video rendering device. The monoscopic 3D video generation device may encode or compress the base layer for transmission. The monoscopic 3D video generation device may encode or compress the enhancement layer based on the determination of transmitting the enhancement layer. The encoded base layer and/or the encoded enhancement layer may then be transmitted by the monoscopic 3D video generation device to the video rendering device for 3D video rendering and/or 2D video rendering.

In an exemplary embodiment of the invention, the video rendering device may determine whether to utilize the enhancement layer which is transmitted by the monoscopic 3D video generation device. The video rendering device may decode or decompress the base layer which is transmitted by the monoscopic 3D video generation device. The video rendering device may decode or decompress the enhancement layer which is transmitted by the monoscopic 3D video generation device, based on the determination of utilizing the transmitted enhancement layer. In this regard, for example, a 3D video may be generated by the video rendering device utilizing the decoded base layer, which comprises the 2D video image data, and the decoded enhancement layer, which comprises the corresponding depth information. A 2D video may be generated by the video rendering device utilizing the decoded base layer which comprises the 2D video image data, for example.

FIG. 1A is a block diagram that illustrates an exemplary monoscopic 3D video camera embodying aspects of the present invention, compared with a conventional stereoscopic video camera. Referring to FIG. 1A, there is shown a stereoscopic video camera 100 and a monoscopic 3D video camera 102. The stereoscopic video camera 100 may comprise two lenses 101a and 101b. Each of the lenses 101a and 101b may capture images from a different viewpoint and images captured via the two lenses 101a and 101b may be combined to generate a 3D image. In this regard, electromagnetic (EM) waves in the visible spectrum may be focused on a first one or more image sensors by the lens 101a (and associated optics) and EM waves in the visible spectrum may be focused on a second one or more image sensors by the lens (and associated optics) 101b.

The monoscopic 3D video camera 102 may comprise a processor 104, a memory 106, one or more depth sensors 108 and one or more image sensors 114. The monoscopic 3D or single-view video camera 102 may capture images via a single viewpoint corresponding to the lens 101c. In this regard, EM waves in the visible spectrum may be focused on one or more image sensors 114 by the lens 101c. The monoscopic 3D video camera 102 may also capture depth information via the lens 101c (and associated optics).

The processor 104 may comprise suitable logic, circuitry, interfaces, and/or code that may be operable to manage operation of various components of the monoscopic 3D video camera 102 and perform various computing and processing tasks.

The memory 106 may comprise, for example, DRAM, SRAM, flash memory, a hard drive or other magnetic storage, or any other suitable memory devices. For example, SRAM may be utilized to store data utilized and/or generated by the processor 104 and a hard-drive and/or flash memory may be utilized to store recorded image data and depth data.

The depth sensor(s) 108 may each comprise suitable logic, circuitry, interfaces, and/or code that may be operable to detect EM waves in the infrared spectrum and determine depth information based on reflected infrared waves. For example, depth information may be determined based on time-of-flight of infrared waves transmitted by an emitter (not shown) in the monoscopic 3D video camera 102 and reflected back to the depth sensor(s) 108. Depth information may also be determined using a structured light method, for example. In such instance, a pattern of light such as a grid of infrared waves may be projected at a known angle onto an object by a light source such as a projector. The depth sensor(s) 108 may detect the deformation of the light pattern such as the infrared light pattern on the object. Accordingly, depth information for a scene may be determined or calculated using, for example, a triangulation technique.

The image sensor(s) 114 may each comprise suitable logic, circuitry, interfaces, and/or code that may be operable to convert optical signals to electrical signals. Each image sensor 114 may comprise, for example, a charge coupled device (CCD) image sensor or a complimentary metal oxide semiconductor (CMOS) image sensor. Each image sensor 114 may capture brightness, luminance and/or chrominance information.

In exemplary operation, the monoscopic 3D video camera 102 may be operable to capture 2D video image data and corresponding depth information for generating 3D video utilizing the image sensor(s) 114 and the depth sensor(s) 108, respectively. In a scalable video hierarchy, a 3D video may comprise a base layer video and an enhancement layer video for processing and/or coding. In this regard, the captures 2D video image data may be stored in the memory 106 as a base layer and the captured corresponding depth information may be stored in the memory 106 separately as an enhancement layer. The processor 104 may determine whether to transmit the enhancement layer to a video rendering device. The determination may be based on, for example, a request from the video rendering and/or 3D rendering capabilities and/or capacities of the video rendering device.

FIG. 18 is a block diagram that illustrates exemplary processing of depth information and 2D color information to generate a 3D image, in accordance with an embodiment of the invention. Referring to FIG. 1B, there is shown a frame of depth information 130, a frame of 2D color information 134 and a frame of 3D image 136. The frame of depth information 130 may be captured by the depth sensor(s) 108 and the frame of 2D color information 134 may be captured by the image sensor(s) 114. The frame of depth information 130 may be utilized while processing the frame of 2D color information 134 by the processor 104 to generate the frame of 3D image 136. The dashed line 132 may indicate a reference plane to illustrate the 3D image. In the frame of depth information 130, a line weight is used to indicate depth. In this regard, for example, the heavier the line, the closer that portion of the frame 130 is to a monoscopic 3D video camera 102. Therefore, the object 138 is farthest from the monoscopic 3D video camera 102, the object 142 is closest to the monoscopic 3D video camera, and the object 140 is at an intermediate depth. In various embodiments of the invention, the depth information may be mapped to a grayscale or pseudo-grayscale image by the processor 104.

The image in the frame 134 is a conventional 2D image. A viewer of the frame 134 perceives the same depth between the viewer and each of the objects 138, 140 and 142. That is, each of the objects 138, 140, 142 appears to reside on the reference plane 132. The image in the frame 136 is a 3D image. A viewer of the frame 136 perceives the object 138 being further from the viewer, the object 142 being closest to the viewer, and the object 140 being at an intermediate depth. In this regard, the object 138 appears to be behind the reference plane 132, the object 140 appears to be on the reference plane 132, and the object 142 appears to be in front of the reference plane 132.

FIG. 2 is a block diagram illustrating an exemplary video communication system that is operable to utilize depth information as an enhancement layer, in accordance with an embodiment of the invention. Referring to FIG. 2, there is shown a video communication system 200. The video communication system 200 may comprise a monoscopic 3D video camera 202 and a video rendering device 204.

The monoscopic 3D video camera 202 may comprise suitable logic, circuitry, interfaces and/or code that may be operable to capture 2D video image data and corresponding depth information. The monoscopic 3D video camera 202 may be substantially similar to the monoscopic 3D video camera 102 in FIG. 1A. In an exemplary embodiment of the invention, the captured 2D video image data may be stored by the monoscopic 3D video camera 202 as a base layer while the captured corresponding depth information may be stored separately as an enhancement layer. The base layer may be encoded or compressed for transmission by a base layer encoder 206a in the monoscopic 3D video camera 202. The enhancement layer may be encoded or compressed for transmission by an enhancement layer encoder 206b in the monoscopic 3D video camera 202. The encoded base layer comprising the 2D video image data may be transmitted to a video rendering device such as the video rendering device 204 via the base layer bitstream 201 and the encoded enhancement layer comprising the corresponding depth information may be transmitted to the video rendering device 204 via the enhancement layer bitstream 203.

The video rendering device 204 may comprise suitable logic, circuitry, interfaces and/or code that may be operable to receive, from the monoscopic 3D video camera 202, encoded or compressed bitstreams 201, 203 which may comprise the 2D video image data and corresponding depth information respectively. The video rendering device 204, such as, for example, a set-top box (STB) and/or a digital TV (DTV) may process the received base layer bitstream 201 and/or the received enhancement layer bitstream 203 for rendering and/or displaying in a 3D or 2D video format. In this regard, the received base layer may be decoded or decompressed by a base layer decoder 208a in the video rendering device 204 and the received enhancement layer may be decoded or decompressed by an enhancement layer decoder 208b in the video rendering device 204.

In operation, the monoscopic 3D video camera 202 may be operable to capture 2D video image data and corresponding depth information. The captured 2D video image data may be stored by the monoscopic 3D video camera 202 as a base layer and the captured corresponding depth information may be stored separately as an enhancement layer. In an exemplary embodiment of the invention, the monoscopic 3D video camera 202 may be operable to determine whether to transmit the enhancement layer to a video rendering device such as the video rendering device 204. The determination may be based on, for example, a request from the video rendering device 204 and/or capabilities and/or capacities of the video rendering device 204. For example, for the purpose of reducing the bandwidth usage, the video rendering device 204 may choose and request not to receive the enhancement layer which comprises the corresponding depth information from the monoscopic 3D video camera 202 for 3D video rendering. The video rendering device 204 may not possess required capability and/or capacity for 3D video rendering, for example. In such instance, the monoscopic 3D video camera 202 may decide not to transmit the enhancement layer which comprises the corresponding depth information to the video rendering device 204. The base layer encoder 206a in the monoscopic 3D video camera 202 may encode or compress the base layer for transmission to the video rendering device 204. The enhancement layer encoder 206b in the monoscopic 3D video camera 202 may encode or compress the enhancement layer based on the determination of transmitting the enhancement layer. The encoded base layer and/or the encoded enhancement layer may then be transmitted by the monoscopic 3D video camera 202 to the video rendering device 204 for 3D video rendering and/or 2D video rendering. The encoded base layer may be transmitted via the base layer bitstream 201. The encoded enhancement layer may be transmitted via the enhancement layer bitstream 203.

In an exemplary embodiment of the invention, the video rendering device 204 may determine whether to utilize the enhancement layer which is transmitted by the monoscopic 3D video camera 202. For example, the video rendering device 204 may choose not to use the enhancement layer for 3D video rendering, although the enhancement layer which comprises the corresponding depth information is received. The base layer decoder 208a in the video rendering device 204 may decode or decompress the base layer which is transmitted by the monoscopic 3D video camera 202. The enhancement layer decoder 208b in the video rendering device 204 may decode or decompress the enhancement layer which is transmitted by the monoscopic 3D video camera 202, based on the determination of utilizing the transmitted enhancement layer. In this regard, for example, a 3D video may then be generated by the video rendering device 204 utilizing the decoded base layer, which comprises the 2D video image data, and the decoded enhancement layer, which comprises the corresponding depth information. A 2D video may then be generated by the video rendering device 204 utilizing the decoded base layer which comprises the 2D video image data, for example.

Although a monoscopic 3D video camera 202 is illustrated in FIG. 2, the invention may not be so limited. Accordingly, other monoscopic 3D video generation device such as a monoscopic 3D camcorder, which generates 3D video content in 2D-plus-depth formats, may be illustrated without departing from the spirit and scope of various embodiments of the invention.

Figure 3A:
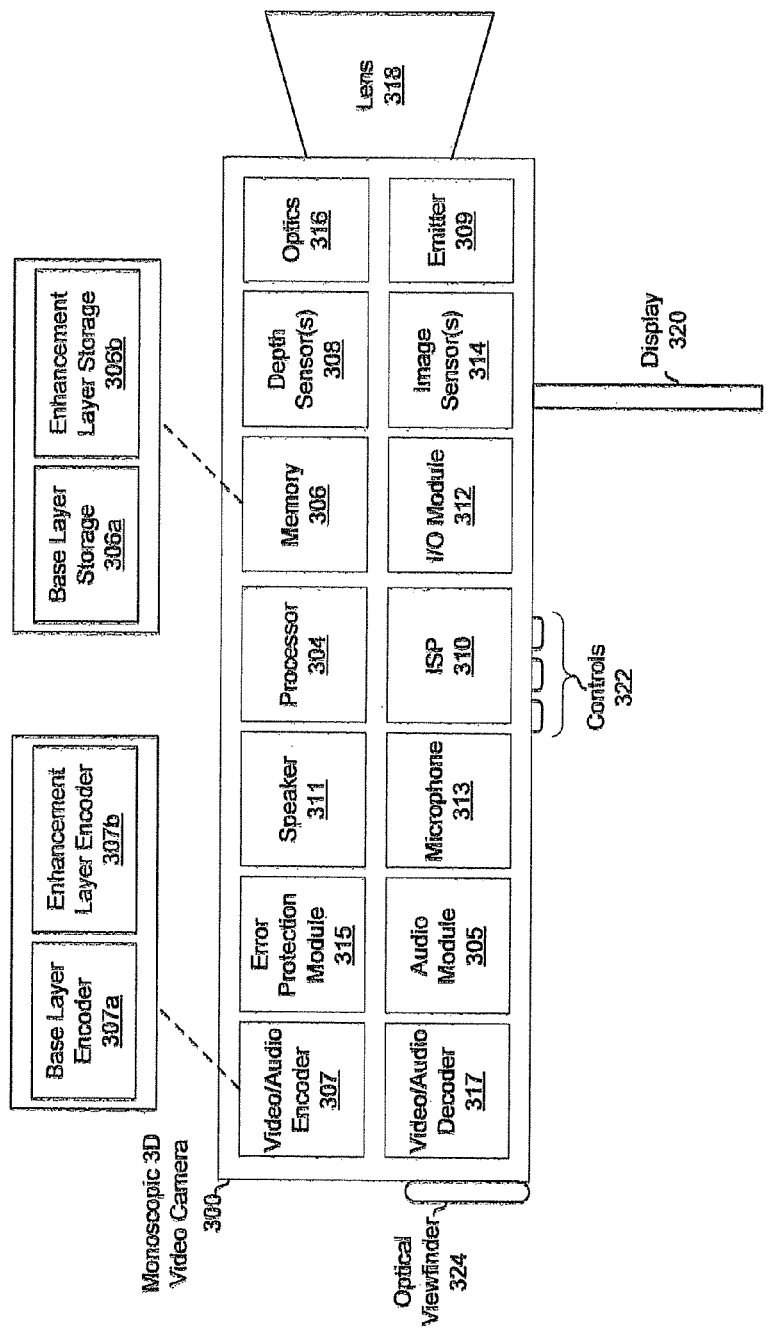
FIG. 3A is a block diagram illustrating an exemplary monoscopic 3D video camera that is operable to utilize depth information as an enhancement layer, in accordance with an embodiment of the invention.

FIG. 3A is a block diagram illustrating an exemplary monoscopic 3D video camera that is operable to utilize depth information as an enhancement layer, in accordance with an embodiment of the invention. Referring to FIG. 3A, there is shown a monoscopic 3D video camera 300. The monoscopic 3D video camera 300 may comprise a processor 304, a memory 306, one or more depth sensors 308, an emitter 309, an image signal processor (ISP) 310, an input/output (I/O) module 312, one or more image sensors 314, an optics 316, a speaker 311, a microphone 313, a video/audio encoder 307, a video/audio decoder 317, an audio module 305, an error protection module 315, a lens 318, a plurality of controls 322, an optical viewfinder 324 and a display 320. The monoscopic 3D video camera 300 may be substantially similar to the monoscopic 3D video camera 102 in FIG. 1A.

The processor 304 may comprise suitable logic, circuitry, interfaces, and/or code that may be operable to coordinate operation of various components of the monoscopic 3D video camera 300. The processor 304 may, for example, run an operating system of the monoscopic 3D video camera 300 and control communication of information and signals between components of the monoscopic 3D video camera 300. The processor 304 may execute code stored in the memory 306. In an exemplary embodiment of the invention, the processor 304 may determine whether to transmit an enhancement layer which comprises captured corresponding depth information to a video rendering device such as the video rendering device 204. The determination may be based on, for example, a request from the video rendering device 204 and/or capabilities and/or capacities of the video rendering device 204.

The memory 306 may comprise, for example, DRAM, SRAM, flash memory, a hard drive or other magnetic storage, or any other suitable memory devices. For example, SRAM may be utilized to store data utilized and/or generated by the processor 304 and a hard-drive and/or flash memory may be utilized to store recorded image data and depth data. In an exemplary embodiment of the invention, the memory 306 may store captured 2D video image data as a base layer while store captured corresponding depth information separately as an enhancement layer. For example, the captured 2D video image data may be stored in a base layer storage 306a in the memory 306 and the captured corresponding depth information may be stored in an enhancement storage 306b in the memory 306.

The depth sensor(s) 308 may each comprise suitable logic, circuitry, interfaces, and/or code that may be operable to detect EM waves in the infrared spectrum and determine depth information based on reflected infrared waves. For example, depth information may be determined based on time-of-flight of infrared waves transmitted by the emitter 309 and reflected back to the depth sensor(s) 308. Depth information may also be determined using a structured light method, for example. In such instance, a pattern of light such as a grid of infrared waves may be projected at a known angle onto an object by a light source such as a projector. The depth sensor(s) 308 may detect the deformation of the light pattern such as the infrared light pattern on the object. Accordingly, depth information for a scene may be determined or calculated using, for example, a triangulation technique.

The image signal processor or image sensor processor (ISP) 310 may comprise suitable logic, circuitry, interfaces, and/or code that may be operable to perform complex processing of captured image data and captured corresponding depth data. The ISP 310 may perform a plurality of processing techniques comprising, for example, filtering, demosaic, Bayer interpolation, lens shading correction, defective pixel correction, white balance, image compensation, color transformation and/or post filtering.

The audio module 305 may comprise suitable logic, circuitry, interfaces and/or code that may be operable to perform various audio functions of the monoscopic 3D video camera 300. In an exemplary embodiment of the invention, the audio module 305 may perform noise cancellation and/or audio volume level adjustment for a 3D scene.

The video/audio encoder 307 may comprise suitable logic, circuitry, interfaces and/or code that may be operable to perform video encoding and/or audio encoding functions. For example, the video/audio encoder 307 may encode or compress captured 2D video images and corresponding depth information and/or audio data for transmission to a video rendering device such as the video rendering device 204. In an exemplary embodiment of the invention, the video/audio encoder 307 may comprise a base layer encoder 307a and an enhancement layer encoder 307b. The base layer encoder 307a may encode or compress the base layer which comprises the captured 2D video image data and the enhancement layer encoder 307b may encode or compress the enhancement layer which comprises the captured corresponding depth information.

The video/audio decoder 317 may comprise suitable logic, circuitry, interfaces and/or code that may be operable to perform video decoding and/or audio decoding functions.

The error protection module 315 may comprise suitable logic, circuitry, interfaces and/or code that may be operable to perform error protection functions for the monoscopic 3D video camera 300. For example, the error protection module 315 may provide error protection to encoded 2D video images and corresponding depth information and/or encoded audio data for transmission to a video rendering device such as the video rendering device 204.

The input/output (I/O) module 312 may comprise suitable logic, circuitry, interfaces, and/or code that may enable the monoscopic 3D video camera 300 to interface with other devices in accordance with one or more standards such as USB, PCI-X, IEEE 1394, HDMI, DisplayPort, and/or analog audio and/or analog video standards. For example, the I/O module 312 may be operable to send and receive signals from the controls 322, output video to the display 320, output audio to the speaker 311, handle audio input from the microphone 313, read from and write to cassettes, flash cards, solid state drives, hard disk drives or other external memory attached to the monoscopic 3D video camera 300, and/or output audio and/or video externally via one or more ports such as a IEEE 1394 port, a HDMI and/or an USB port for transmission and/or rendering.

The image sensor(s) 314 may each comprise suitable logic, circuitry, interfaces, and/or code that may be operable to convert optical signals to electrical signals. Each image sensor 314 may comprise, for example, a charge coupled device (CCD) image sensor or a complimentary metal oxide semiconductor (CMOS) image sensor. Each image sensor 314 may capture brightness, luminance and/or chrominance information.

The optics 316 may comprise various optical devices for conditioning and directing EM waves received via the lens 318. The optics 316 may direct EM waves in the visible spectrum to the image sensor(s) 314 and direct EM waves in the infrared spectrum to the depth sensor(s) 308. The optics 316 may comprise, for example, one or more lenses, prisms, luminance and/or color filters, and/or mirrors.

The lens 318 may be operable to collect and sufficiently focus electromagnetic (EM) waves in the visible and infrared spectra.

The display 320 may comprise a LCD display, a LED display, an organic LED (OLED) display and/or other digital display on which images recorded via the monoscopic 3D video camera 300 may be displayed. In an embodiment of the invention, the display 320 may be operable to display 3D images.

The controls 322 may comprise suitable logic, circuitry, interfaces, and/or code that may enable a user to interact with the monoscopic 3D video camera 300. For example, the controls 322 may enable the user to control recording and playback. In an embodiment of the invention, the controls 322 may enable the user to select whether the monoscopic 3D video camera 300 records in 2D mode or 3D mode.

The optical viewfinder 324 may enable a user to view or see what the lens 318 "sees," that is, what is "in frame".

In operation, the image sensor(s) 314 may capture brightness, luminance and/or chrominance information associated with a 2D video image frame and the depth sensor(s) 308 may capture corresponding depth information. In various embodiments of the invention, various color formats, such as RGB and YCrCb, may be utilized. The depth information may be stored in the memory 306 as metadata or as an additional layer of information, which may be utilized when rendering a 3D video image from the 2D image information.

In an exemplary embodiment of the invention, the captured 2D video image data may be stored in the base layer storage 306a in the memory 306 as a base layer and the captured corresponding depth information may be stored in the enhancement layer storage 306b in the memory 306 separately as an enhancement layer. The processor 304 may determine whether to transmit the enhancement layer to a video rendering device such as the video rendering device 204. The determination may be based on, for example, a request from the video rendering device 204 and/or 3D rendering capabilities and/or capacities of the video rendering device 204. The base layer encoder 307a in the video/audio encoder 307 may encode or compress the base layer for transmission to the video rendering device 204. The enhancement layer encoder 307b in the video/audio encoder 307 may encode or compress the enhancement layer based on the determination of transmitting the enhancement layer. The encoded base layer and/or the encoded enhancement layer may then be transmitted by the monoscopic 3D video camera 300 via the I/O module 312 to the video rendering device 204 for 3D video rendering and/or 2D video rendering.

Figure 3B:
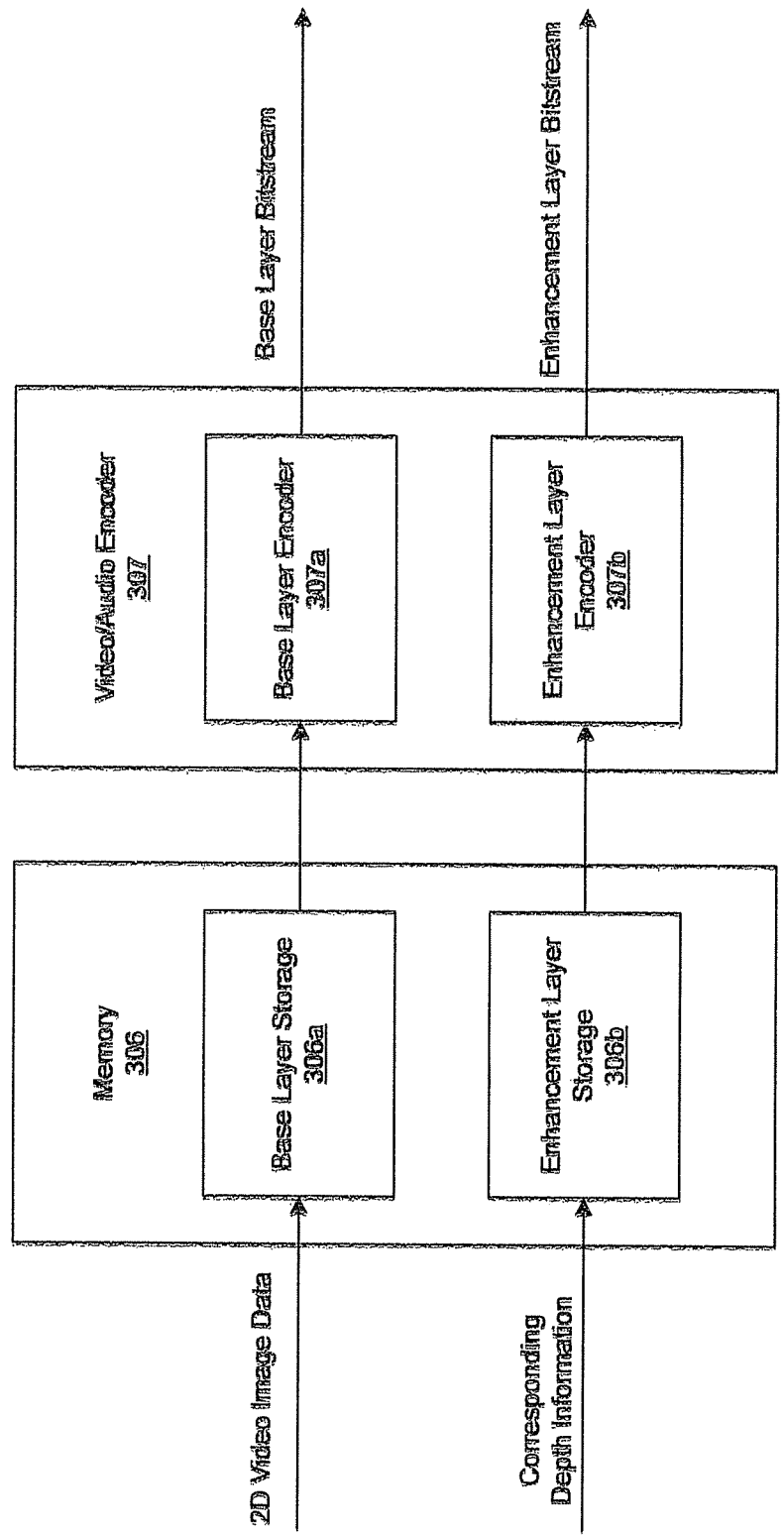
FIG. 3B is a block diagram illustrating exemplary base layer and enhancement layer, in accordance with an embodiment of the invention.

FIG. 3B is a block diagram illustrating exemplary base layer and enhancement layer, in accordance with an embodiment of the invention. Referring to FIG. 3B, there is shown the memory 306 and the video/audio encoder 307 described above with respect to FIG. 3A. The memory 306 comprises the base layer storage 306a and the enhancement layer storage 306b. The video/audio encoder 307 comprises the base layer encoder 307a and the enhancement layer encoder 307b.

In exemplary operation, captured 2D video image data may be stored in the base layer storage 306a in the memory 306 as base layer data while captured corresponding depth information may be stored in the enhancement layer storage 306b in the memory 306 separately as enhancement layer data. In this regard, for example, the base layer encoder 307a in the video/audio encoder 307 may be operable to encode or compress the base layer data to generate a base layer bitstream for transmission to a video rendering device such as the video rendering device 204. The enhancement layer encoder 307b in the video/audio encoder 307 may be operable to encode or compress the enhancement layer data to generate an enhancement layer bitstream for transmission to the video rendering device 204, for example. The determination of whether to transmit the enhancement layer data, which comprises the corresponding depth information, may be based on a request from the video rendering device 204 and/or 3D rendering capabilities and/or capacities of the video rendering device 204.

Figure 4:
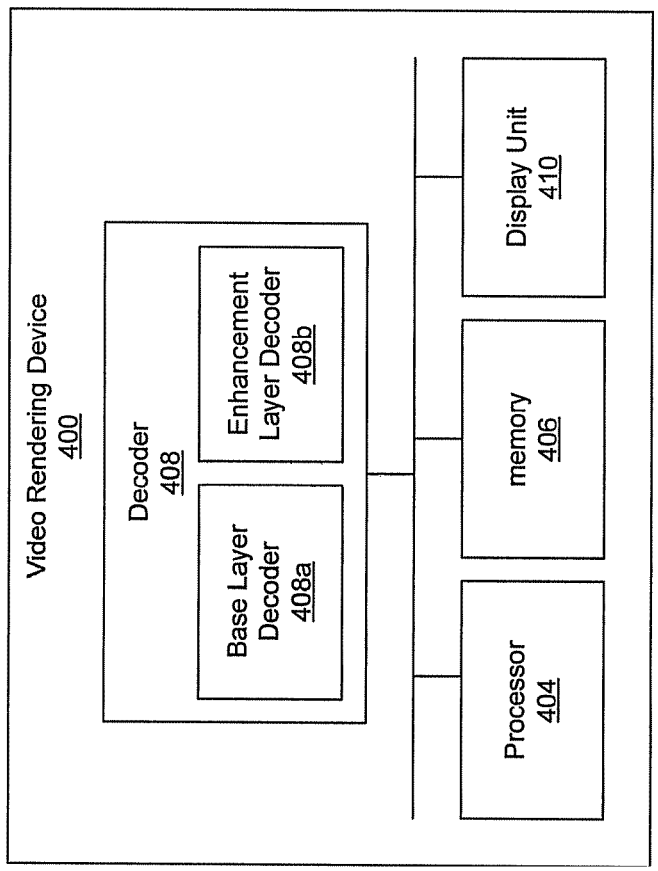
FIG. 4 is a block diagram illustrating an exemplary video rendering device that is operable to generate 3D video utilizing depth information as an enhancement layer, in accordance with an embodiment of the invention.

FIG. 4 is a block diagram illustrating an exemplary video rendering device that is operable to generate 3D video utilizing depth information as an enhancement layer, in accordance with an embodiment of the invention. Referring to FIG. 4, there is shown a video rendering device 400. The video rendering device 400 may comprise a processor 404, a memory 406, a decoder 408 and a display unit 410. The decoder 408 may comprise a base layer decoder 408a and an enhancement layer decoder 408b. The video rendering device 400 may be substantially similar to the video rendering device 204 in FIG. 2.

The processor 404 may comprise suitable logic, circuitry, interfaces and/or code that may be operable to communicate with various components of the video rendering device 400 such as the decoder 408 and the display unit 410 to perform various functions of the video rendering device 400. The processor 404 may comprise any type of processor or processing circuit such as a video processor. In an exemplary embodiment of the invention, the processor 404 may determine whether to utilize a received enhancement layer which comprises corresponding depth information. The processor 404 may generate a 3D video utilized a received base layer which comprises 2D video image data and the received enhancement layer which comprises the corresponding depth information. In other instances, the processor 404 may generate a 2D video utilized only the received base layer which comprises the 2D video image data. The generated 3D video or 2D video may be presented or displayed by the display unit 410.

The memory 406 may comprise suitable logic, circuitry, interfaces and/or code that may be operable to store information such as executable instructions and data that may be utilized by the processor 404 and/or the decoder 408 to perform various functions of the video rendering device 400.

The decoder 408 may comprise suitable logic, circuitry, interfaces and/or code that may be operable to decode or decompress encoded video bitstreams which may be received from a transmitter such as the monoscopic 3D video camera 202. The received video bitstreams may comprise a base layer bitstream, which comprises 2D video image data, and an enhancement layer bitstream, which comprises corresponding depth information. In an exemplary embodiment of the invention, the base layer decoder 408a in the decoder 408 may decode or decompress the received base layer. The enhancement layer decoder 408b in the decoder 408 may decode or decompress the received enhancement layer.

The display unit 410 may comprise suitable logic, circuitry, interfaces and/or code that may be operable to display or present 3D video content and/or 2D video content to users or viewers.

In operation, the video rendering device 400 may receive a base layer bitstream such as the base layer bitstream 201 and an enhancement layer bitstream such as the enhancement layer bitstream 203 from a transmitter such as the monoscopic 3D video camera 202. The processor 404 may determine whether to utilize the enhancement layer which is transmitted by the monoscopic 3D video camera 202. The base layer decoder 408a in the decoder 408 may decode or decompress the base layer which is received from the monoscopic 3D video camera 202. The enhancement layer decoder 408b in the decoder 408 may decode or decompress the enhancement layer which is received from the monoscopic 3D video camera 202, based on the determination of utilizing the received enhancement layer. In this regard, for example, a 3D video may then be generated by the processor 404 utilizing the decoded base layer, which comprises the 2D video image data, and the decoded enhancement layer, which comprises the corresponding depth information. A 2D video may then be generated by the processor 404 utilizing the decoded base layer which comprises the 2D video image data, for example. The generated 3D video or the generated 2D video may be presented or displayed by the display unit 410.

Figure 5:
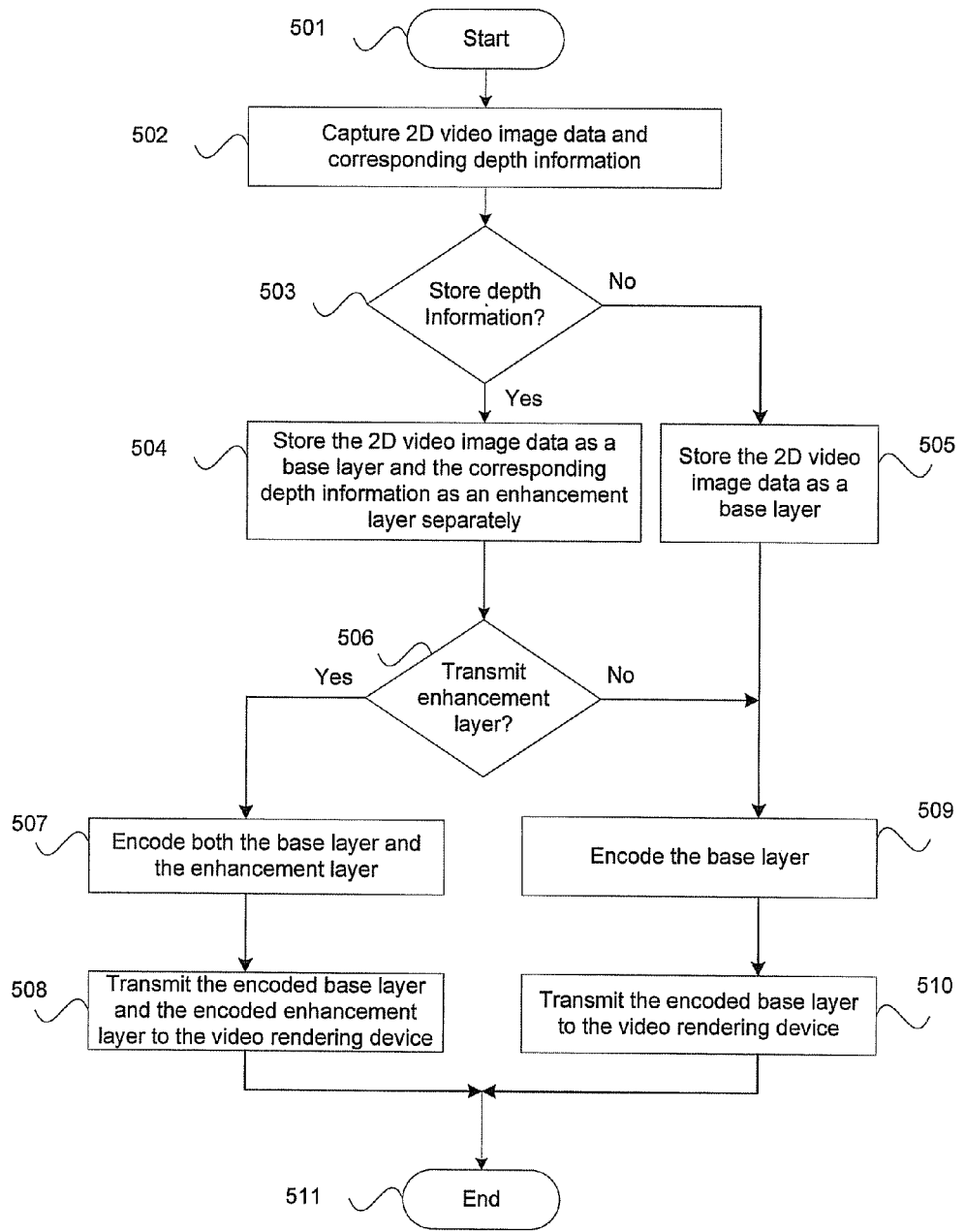
FIG. 5 is a flow chart illustrating exemplary steps for utilizing depth information as an enhancement layer, in accordance with an embodiment of the invention.

FIG. 5 is a flow chart illustrating exemplary steps for utilizing depth information as an enhancement layer, in accordance with an embodiment of the invention. Referring to FIG. 5, the exemplary steps start at step 501. In step 502, the monoscopic 3D video camera 300 may be operable to capture 2-D video image data and corresponding depth information. The 2D video image data may be captured via the one or more image sensors 314 and the corresponding depth information may be captured via the one or more depth sensors 308 in the monoscopic 3D video camera 300. In step 503, the processor 304 in the monoscopic 3D video camera 300 may determine whether to store the captured corresponding depth information for rendering, in instances when the captured corresponding depth information is determined not to be stored, the exemplary steps may proceed to step 505. In step 505, the captured 2D video image data may be stored in the base layer storage 306a in the monoscopic 3D video camera 300 as a base layer. In step 509, the base layer encoder 307a in the monoscopic 3D video camera 300 may be operable to encode the base layer which may comprise the 2D video image data. In step 510, the encoded base layer may be transmitted via the I/O module 312 in the monoscopic 3D video camera 300 to a video rendering device such as the video rendering device 204 for rendering. The exemplary steps may proceed to the end step 511.

In step 503, in instances when it is determined that the captured corresponding depth information is to be stored, the exemplary steps may proceed to step 504. In step 504, the captured 2D video image data may be stored in the base layer storage 306a as a base layer while the captured corresponding depth information may be stored in the enhancement layer storage 306b as an enhancement layer separately. In step 506, the processor 304 in the monoscopic 3D video camera 300 may determine whether to transmit the enhancement layer to a video rendering device such as the video rendering device 204 for rendering. The determination may be based on, for example, a request from the video rendering device 204 and/or 3D rendering capabilities and/or capacities of the video rendering device 204. In instances when the enhancement layer is determined to be transmitted, the exemplary steps may proceed to step 507. In step 507, the monoscopic 3D video camera 300 may encode both the base layer and the enhancement layer utilizing the base layer encoder 307a and the enhancement layer encoder 307b respectively. In step 508, the encoded base layer and the encoded enhancement layer may be transmitted via the I/O module 312 to the video rendering device 204 for rendering. The exemplary steps may proceed to the end step 511. In step 506, in instances when it is determined that the corresponding depth information is not to be transmitted, the exemplary steps may proceed to step 509.

Figure 6:
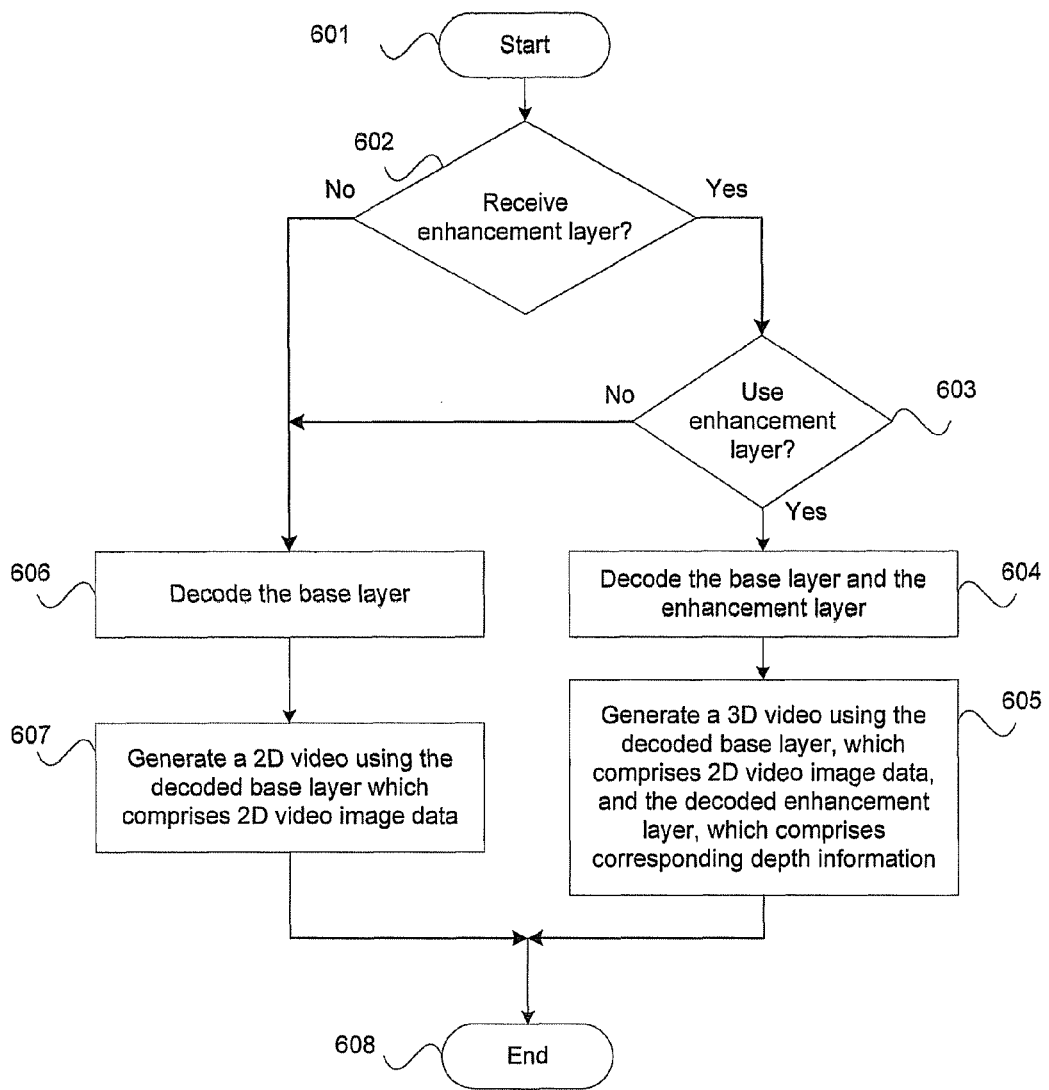
FIG. 6 is a flow chart illustrating exemplary steps for generating 3D video utilizing depth information, as an enhancement layer, in accordance with an embodiment of the invention.

FIG. 6 is a flow chart illustrating exemplary steps for generating 3D video utilizing depth information as an enhancement layer, in accordance with an embodiment of the invention. Referring to FIG. 6, the exemplary steps start at step 601. In step 602, the processor 404 in the video rendering device 400 may determine whether an enhancement layer is received in additional to a base layer. The base layer and/or the enhancement layer may be received from a transmitter such as the monoscopic 3D video camera 202. The received base layer may comprise 2D video image data while the received enhancement layer may comprise corresponding depth information. In instances when the enhancement layer is not received, the exemplary steps may proceed to step 606. In step 606, the base layer decoder 408a in the video rendering device 400 may decode the received base layer. In step 607, the processor 404 may generate a 2D video using the decoded base layer which comprises the 2D video image data. The exemplary steps may proceed to the end step 608.

In step 602, in instances when the enhancement layer is received in addition to the base layer, the exemplary steps may proceed to step 603. In step 603, the processor 404 may determine whether to use the received enhancement layer. In instances when the enhancement layer is used for rendering, the exemplary steps may proceed to step 604. In step 604, the base layer decoder 408a in the video rendering device 400 may decode the received base layer, and the enhancement layer decoder 408b in the video rendering device 400 may decode the received enhancement layer. In step 605, the processor 404 may generate a 3D video using the decoded base layer which comprises the 2D video image data and the decoded enhancement layer which comprises the corresponding depth information. The exemplary steps may proceed to the end step 608. In step 603, in instances when the enhancement layer is not used for rendering, the exemplary steps may proceed to step 606.

In various embodiments of the invention, a monoscopic 3D video generation device such as the monoscopic 3D video camera 300 may comprise one or more image sensors 314 and one or more depth sensors 308. The monoscopic 3D video camera 300 may capture 2D video image data via the one or more image sensors 314 and capture corresponding depth information via the one or more depth sensors 308. The captured 2D video image data may be stored in a base layer storage 306a in the monoscopic 3D video camera 300 as a base layer and the captured corresponding depth information may be stored in an enhancement layer storage 306b in the monoscopic 3D video camera 300 separately as an enhancement layer.

In an exemplary embodiment of the invention, a processor 304 in the monoscopic 3D video camera 300 may determine whether to transmit the enhancement layer to a video rendering device such as the video rendering device 204. The determination may be based on, for example, a request from the video rendering device 204 and/or capabilities and/or capacities of the video rendering device 204. A base layer encoder 307a in a video/audio encoder 307 of the monoscopic 3D video camera 300 may encode or compress the base layer for transmission to the video rendering device 204. An enhancement layer encoder 307b in the video/audio encoder 307 may encode or compress the enhancement layer based on the determination of transmitting the enhancement layer. The encoded base layer and/or the encoded enhancement layer may then be transmitted by the monoscopic 3D video camera 300 via an I/O module 312 in the monoscopic 3D video camera 300 to the video rendering device 204 for 3D video rendering and/or 2D video rendering.

In an exemplary embodiment of the invention, a processor 404 in the video rendering device 400 may determine whether to utilize the enhancement layer which is transmitted by the monoscopic 3D video camera 300. A base layer decoder 408*a* in a decoder 408 of the video rendering device 400 may decode or decompress the base layer which is transmitted by the monoscopic 3D video camera 300. An enhancement layer decoder 408*b* in the decoder 408 may decode or decompress the enhancement layer which is transmitted by the monoscopic 3D video camera 300, based on the determination of utilizing the transmitted enhancement layer. In this regard, for example, a 3D video may be generated by the processor 404 utilizing the decoded base layer, which comprises the 2D video image data, and the decoded enhancement layer, which comprises the corresponding depth information. A 2D video may be generated by the processor 404 utilizing the decoded base layer which comprises the 2D video image data, for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine, and/or computer to perform the steps as described herein for utilizing depth information as an enhancement layer.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video in a monoscopic three-dimensional (3D) video generation device comprising one or more depth sensors, the method comprising:

storing captured two-dimensional (2D) video image data as a base layer;

storing captured depth information corresponding to the 2D video image data as an enhancement layer in response to a request from a rendering device; and selectively transmitting the enhancement layer in response to the request from the rendering device, wherein the request from the rendering device is based on a processor decision to limit bandwidth usage and a 3D rendering capacity of a video rendering device.

2. The method according to claim 1, comprising capturing said 2D video image data via one or more image sensors in said monoscopic 3D video generation device.

3. The method according to claim 1, comprising:

encoding said base layer; and determining whether to encode said enhancement layer in response to the request from the rendering device.

4. The method according to claim 3, comprising transmitting said encoded base layer and/or said encoded enhancement layer to said video rendering device.

5. The method according to claim 4, wherein said video rendering device determines whether to utilize said transmitted enhancement layer.

6. The method according to claim 5, wherein said video rendering device:

determines whether the transmitted enhancement layer is received;

decodes said transmitted base layer; and determines whether to decode said transmitted enhancement layer in response to the 3D rendering capacity of the video rendering device and the receipt of the transmitted enhancement layer.

7. The method according to claim 6, wherein said video rendering device generates a 3D video utilizing said decoded base layer, which comprises said 2D video image data, and said decoded enhancement layer, which comprises said depth Information.

8. The method according to claim 1, comprising encoding an enhancement layer to transmit to the video rendering device in response to a capability of the video rendering device to render 3D video.

9. A system for processing video, the system comprising:

one or more processors and/or circuits for use in a monoscopic three-dimensional (3D) video generation device comprising one or more depth sensors, wherein said one or more processors and/or circuits are operable to:

store captured two-dimensional (2D) video Image data as a base layer in a base layer storage of a memory unit;

store captured corresponding depth Information separately as an enhancement layer stored separately in an enhancement layer storage in the memory unit, in response to a request from the video rendering device, wherein the request by the video rendering device is based on a decision by the rendering device to limit bandwidth usage; and determine whether to transmit the enhancement layer to a video rendering device in response to the request from the video rendering device.

10. The system according to claim 9, wherein said one or more processors and/or circuits are operable to capture said 2D video Image data via one or more image sensors In said monoscopic 3D video generation device.

11. The system according to claim 9, wherein said one or more processors and/or circuits are operable to capture said corresponding depth information via said one or more depth sensors in said monoscopic 3D video generation device.

12. The system according to claim 9, wherein said one or more processors and/or circuits are operable to:
   encode said base layer; and
   selectively encode said enhancement layer based on said determination in response to the request from the video rendering device.

13. The system according to claim 9, wherein said video rendering device determines whether to utilize said transmitted enhancement layer.

14. The system according to claim 13, wherein said video rendering device:
   decodes said transmitted base layer; and
   decodes said transmitted enhancement layer based on said determination.

15. The system according to claim 14, wherein said, video rendering device generates a 3D video utilizing said decoded base layer, which comprises said 2D video image data, and said decoded enhancement layer, which comprises said corresponding depth information.

16. The system according to claim 14, wherein said video rendering device generates a 2D video utilizing said decoded base layer which comprises said 2D video image data.

17. A system for processing video, the system comprising:
   one or more processors and/or circuits for use in a monoscopic three-dimensional (3D) video generation device comprising one or more depth sensors,
   a memory unit, wherein the one or more processors and/or circuits are operable to store a two-dimensional (2D) video image base layer and store a 3D video image enhancement layer in the memory unit;
   a base layer encoder configured to encode the 2D video image base layer;
   an enhancement layer encoder configured to encode the 3D video image enhancement layer;
   wherein the one or more processors and/or circuits are operable to selectively:
      store and encode the base layer in response to a first request from a video rendering device, or
      store and encode the base layer and the enhancement layer in response to a second request from the video rendering device.

18. The system according to claim 17, wherein the one or more processors and/or circuits are operable to determine whether to transmit the base layer, or the base layer and the enhancement layer to the video rendering device in response to the capability of the video rendering device to render 3D video.

19. The system according to claim 17, wherein the second request from the video rendering device is based on a capacity of the video rendering to render 3D video or a determination by the video rendering device to limit a bandwidth usage.

20. The system according to claim 17, wherein the one or more processors and/or circuits are operable to:
   store and encode the base layer in response to the first request from a video rendering device, and
   store and encode the base layer and the enhancement layer in response to the second request from the video rendering device.

* * * * *